United States Patent [19]

Faulkner, III

[11] Patent Number: 4,951,917
[45] Date of Patent: Aug. 28, 1990

[54] DYNAMIC RESPONSE TIME FOR ELECTROMAGNETIC VALVING

[75] Inventor: W. Harrison Faulkner, III, Salinas, Calif.

[73] Assignee: Slautterback Corporation, Monterey, Calif.

[21] Appl. No.: 446,655

[22] Filed: Dec. 6, 1989

[51] Int. Cl.⁵ .............................................. F16K 31/06
[52] U.S. Cl. ............................ 251/129.15; 251/129.21
[58] Field of Search ....................... 251/129.21, 129.15

[56] References Cited

U.S. PATENT DOCUMENTS

| 2,607,368 | 8/1952 | Mayer | 251/129.21 |
|---|---|---|---|
| 2,677,524 | 5/1954 | Parsons | 251/129.21 |
| 4,531,708 | 7/1985 | Livet | 251/129.21 X |
| 4,659,016 | 4/1987 | Faulkner | 239/135 |
| 4,712,767 | 12/1987 | Losser et al. | 251/129.14 |
| 4,774,976 | 10/1988 | Janecke et al. | 137/14 |

FOREIGN PATENT DOCUMENTS

| 538608 | 3/1957 | Canada | 251/129.21 |
|---|---|---|---|
| 1389055 | 4/1975 | United Kingdom | 251/129.21 |

Primary Examiner—Arnold Rosenthal
Attorney, Agent, or Firm—Thomas Schneck

[57] ABSTRACT

An electromagnetic valving assembly for viscous fluid material having a solenoid body with an axial flow passageway and an outlet port. A ferromagnetic pole piece is attached at an upstream end of the solenoid body and is in fluid communication with a source of viscous material, such as hot-melt adhesive. An armature is reciprocatingly mounted within the flow passageway and a spring biases the armature in a closed position which blocks the outlet port. A solenoid coil is disposed to cause magnetization of the pole piece during conduction of current through the solenoid coil. The magnetization provides an attractive force between the pole piece and the armature to draw the armature into contact with the downstream surface of the pole piece. The upstream end geometry of the armature includes a center bore for passage of the viscous material and includes a recessed inner region and raised C-shaped edges. Contact between the pole piece and the armature is limited to the C-shaped raised edges. De-energization of the solenoid coil releases the armature. Movement of the armature as a result of the spring bias, however, requires a migration of the viscous material between the abutting pole piece and armature. Because the abutment is limited to the outside edge of the upstream end of the armature, migration is restricted to a short distance and the dynamic closing response time is significantly improved.

17 Claims, 2 Drawing Sheets

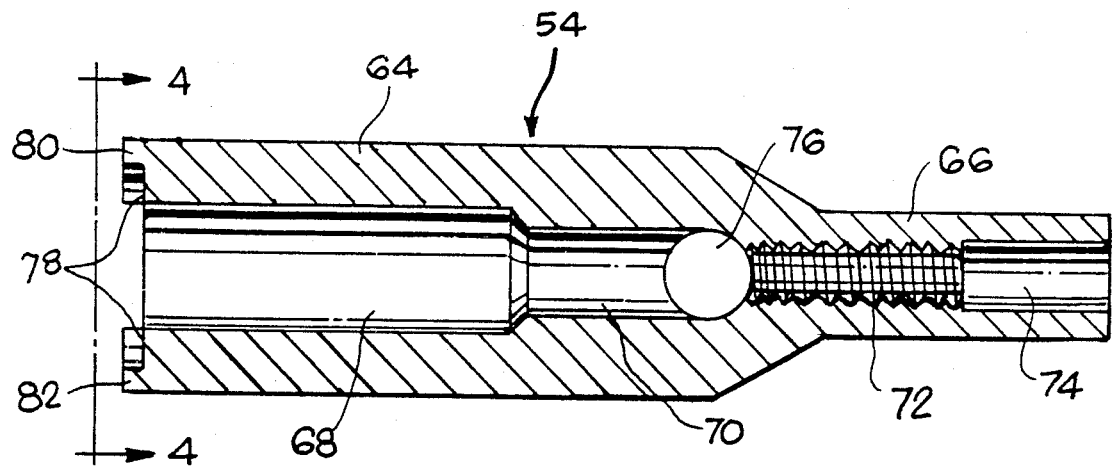
Fig. 3
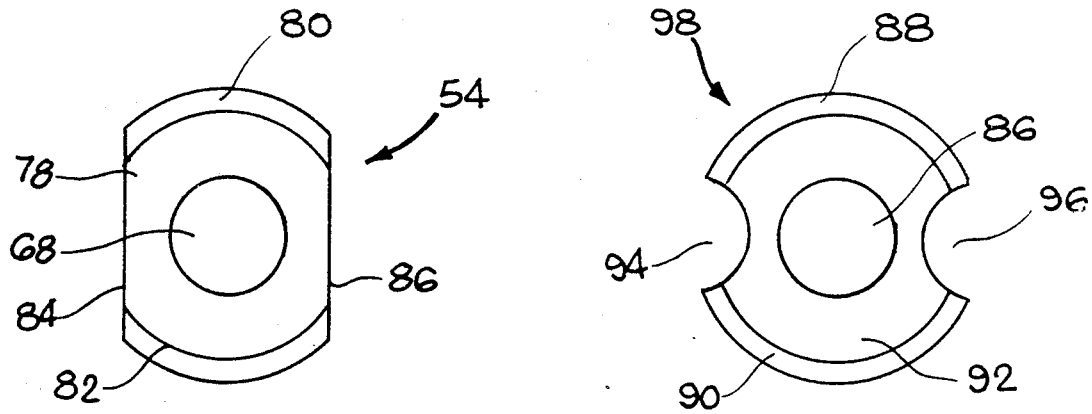
Fig. 4
Fig. 5

DYNAMIC RESPONSE TIME FOR ELECTROMAGNETIC VALVING

TECHNICAL FIELD

The present invention relates generally to an electromagnetic solenoid device and particularly to solenoid valving of viscous material.

BACKGROUND ART

U.S. Pat. No. 4,659,016 to Faulkner, assigned to the assignee of the present invention, describes a dispenser for hot-melt adhesive. Adhesive from a heated hose enters a flow passageway in a solenoid assembly and is selectively channeled from the flow passageway to a number of nozzles on a dispensing bar. An armature in the flow passageway of the solenoid is biased into a blocking position to prevent fluid communication between the heated hose and the nozzles. Energizing the coil of the solenoid creates a magnetic field which attracts the armature. The magnetic force overcomes the bias on the armature and opens the path to release of hot-melt material from the nozzles. Subsequent de-energization of the coil releases the armature to again block passage of the viscous material.

The dispenser described in the above-mentioned patent to Faulkner is illustrated as used in the sealing of large cardboard boxes on an assembly line. In the sealing of cardboard boxes on packaging assembly lines, the timing tolerances for valving the adhesive on or off need not be exacting. Delays of 0.05 seconds are exceptable. However, in other applications timing may be critical. For example, it may be desirable to apply hot-melt adhesive in small, discreet quantities dispensed in rapid succession to form a row of dots on a work surface. The dot pattern is possible only if adhesive flow from dispenser nozzles is more responsive to energizing and de-energizing the coil of solenoid. That is, opening time and closing time of the solenoid is critical.

As noted above, in the solenoid assembly of Faulkner, the armature is biased so that the downstream end of the armature blocks flow to the dispenser nozzles. Upon energization of the solenoid coil, the generated magnetic field must overcome the force of a spring which biases the armature in the closed position and must overcome the resistance of the viscous adhesive material since the adhesive must be displaced to permit movement of the armature. Thus, maximization of magnetic force is a key factor in the opening time of the solenoid. Migration of adhesive also plays an important factor in determining the closing time of the solenoid. In the open position, the upstream end of the armature abuts a downstream end of a pole piece of the solenoid. Upon deenergization of the solenoid coil, the spring biasing of the armature into the closed position must overcome the force created by the abutment of the ends of the armature and the pole piece. The migration of adhesive between the two ends is a slow process since adhesive is an extremely viscous material and since the pumping pressure for adhesive application is often 500–600 psi.

It is an object of the present invention to increase the responsiveness of an electromagnetic valving assembly for viscous fluid material such as hot-melt adhesive.

SUMMARY OF THE INVENTION

The above object has been met by an electromagnetic valving assembly having a solenoid in which armature-to-pole piece contact is limited to an end geometry which facilitates migration of viscous fluid material while minimizing any loss of performance of the magnetic attraction between the pole piece and the armature. It has been discovered that in the design of the end geometry of a pole piece or an armature, there is a necessary tradeoff between maximizing attractive magnetic force of the two members and minimizing the adverse effects of the slow migration of viscous adhesive material Here, by limiting migration to extreme edges between the pole piece and armature, the tendency of the abutting members to resist separation is minimized without a significant loss in performance.

The armature and the pole piece are components of an electromagnetic valving assembly having a solenoid body with an axial flow passageway therethrough. An inlet directs a stream of viscous fluid material into the axial passageway and a coil surrounds the flow passageway for generating a magnetic field which magnetizes the pole piece disposed at the inlet end of the housing. Magnetization of the pole piece provides an attractive force for drawing the armature into contact with the downstream end of the pole piece. The attractive force overcomes the bias of a spring between the pole piece and the armature. Because both the pole piece and the armature have central bores for the flow of the viscous material, the magnetic force is concentrated at the edges. The upstream end of the armature has a recessed region surrounding the central bore and has a raised outside edge where the magnetic flux density is greatest. Contact between the armature and the pole piece is limited to the raised outside edge.

Upon de-energization of the solenoid coil, the spring begins to move the armature away from the pole piece. Because of the limited contact between the two members, migration of the viscous material between abutting surfaces is relatively minor. Therefore, the dynamic closing response time is improved by the end geometry of the armature.

Preferably, the raised edge of the armature is a plurality of C-shaped edge lips. As will be explained more fully below, the height of the raised lips plays a role in optimizing results. A height which is excessive will affect the performance of the electromagnetic valving assembly, since the recessed region is affected to a lesser degree by the attractive force of the magnetic field generated by the solenoid coil. On the other hand, an insufficient height of the raised C-shaped edged lip will not adequately address the migration problem of the viscous fluid material between the pole piece and the armature, especially after a period of time in which char is allowed to collect within the recessed region of the armature. Char is defined as the chemical degradation inherent with hot-melt adhesive.

Likewise, the width of the raised C-shaped edged lips is a factor in optimizing results. Insufficient width results in a high-maintenance solenoid, since each opening of the valving assembly necessitates a collision between the raised lips and the pole piece. Over a period of time, excessively narrow lips are susceptible to premature wear. On the other hand, the raised edged portion should not be so wide as to require a considerable amount of migration between abutting surfaces.

An alternative embodiment is to reverse the end geometries of the pole piece and the armature so that it is the pole piece which includes the recessed region about a central bore and includes the raised edge for limiting contact with the armature. Regardless of which member includes the raised edge, an advantage of the present invention is that the dynamic closing response time upon de-energization of the solenoid coil is improved without a significant effect on the opening response time. The raised portion is along an area in which the magnetic lines of flux are concentrated, thereby minimizing any loss in performance.

By providing an armature end geometry having raised lips along the extreme edge, the raised portion aids in ensuring that the armature remains perpendicular to the pole piece. The raised region contacts the inside diameter of the flow passageway through the solenoid housing and aids in maintaining perpendicularity. Moreover, in comparison to raising an inner portion of either the pole piece or the armature, a raised edge portion provides a greater area to withstand the collision of the two surfaces upon each energization of the solenoid coil. The greater area of contact also aids in ensuring perpendicularity.

BRIEF DESCRIPTION OF THE DRAWINGS

FIG. 3 is a side sectional view of the armature of FIG. 2.

FIG. 4 is an end view of a first embodiment of the end geometry of the armature of FIG. 3, taken along lines 4—4.

FIG. 5 is an end view of a second embodiment of the end geometry of the armature of FIG. 3.

BEST MODE FOR CARRYING OUT THE INVENTION

Figure 1:
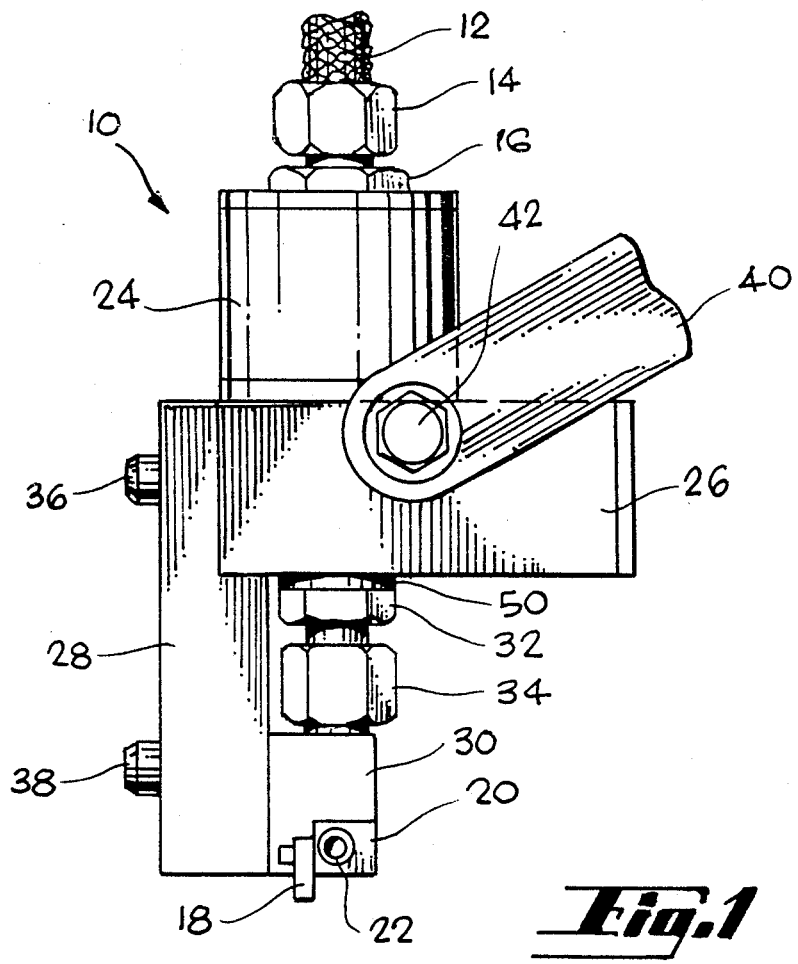
FIG. 1 is a side view of a hot-melt adhesive dispenser having an electromagnetic valving assembly in accord with the present invention.

With reference to FIG. 1, a hot-melt adhesive dispenser 10 receives adhesive from a heated hose 12. An internally-threaded swivel nut is tightened onto a threaded fitting 16 to provide a leak-free attachment of the heated hose to the dispenser 10.

The adhesive dispenser 10 has an inverted T-shaped configuration, with nozzles 18 on the front side of a rectangularly shaped dispensing bar 20. An Allen-head screw 22 at the end of the dispensing bar 20 may be removed for cleaning of the passageway extending through the dispensing bar.

Hot-melt adhesive from the heated hose 12 travels through an axial flow passageway, not shown, in a solenoid body 24. The solenoid body acts as a housing for a coil which generates a magnetic field within the axial flow passageway. As will be explained more fully below, the magnetic field attracts an armature to selectively permit fluid communication between the heated supply hose 12 and the nozzles 18. The fluid flow through the solenoid body 24 enters a heated dispenser head 26 having a plurality of heat units. The heated dispenser head is raised to a temperature which ensures that the hot-melt adhesive does not solidify within the adhesive dispenser 10. A heat transfer block 28 conducts heat from the dispenser head 26 to a center inlet portion 30. The heat transfer block 28 should be sufficiently massive and thermally conductive to be a heat reservoir which maintains the temperature of the adhesive at the nozzles 18 with a temperature drop relative to the dispenser head 26 of 40°–50° F. The electrical connection for activating the coil of the solenoid body 24 and the heat units of the dispenser head 26 are not shown.

After progressing through the solenoid body 24 and the heated dispenser head 26, adhesive enters a coupling assembly having a pair of nuts 32 and 34 for passage to the inlet portion 30. The coupling assembly places the dispensing bar 20 in a direct hot-melt material dispensing line with the heated supply hose 12. The coupling assembly which includes the nuts 32 and 34 provides an inelastic coupling, and the swivel nuts allow for dimensional tolerances of the interconnected dispenser head 26, the heat transfer block 28 and the center inlet portion 30.

The heat transfer block 28 is mounted to the dispenser head 26 by a bolt 36 and is mounted to the center inlet portion 30 by a second bolt 38. A bracket 40 is attached to the dispenser head by a bolt 42 for fixing the hot-melt adhesive dispenser 10 in position.

The hot-melt adhesive dispenser illustrated in FIG. 1 is meant to be exemplary. In practice, a single nozzle may be attached directly to the nut 34, thereby eliminating the need of the dispenser bar 20, the inlet portion 30 and the heat transfer block 28.

Figure 2:
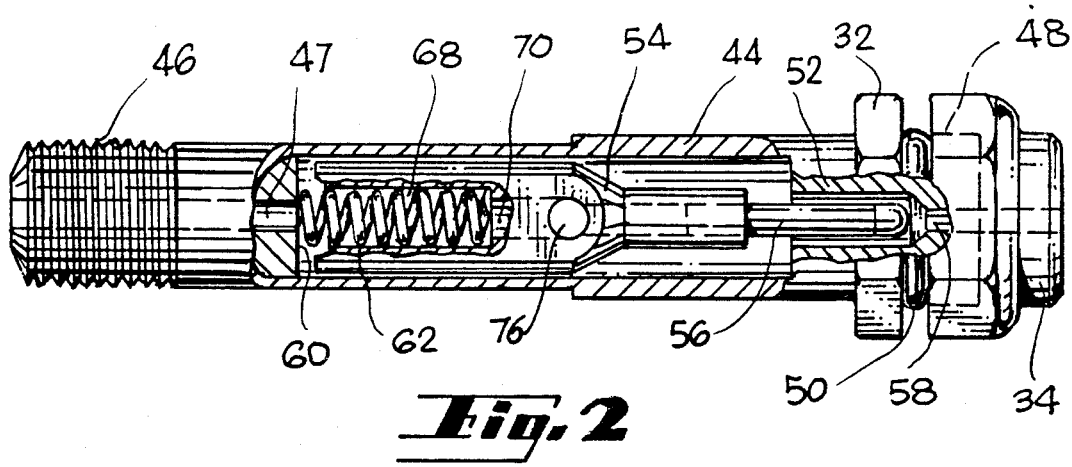
FIG. 2 is a partially cut away view of a portion of the valving assembly of FIG. 1.

Referring now to FIG. 2, a guide tube 44 is slidably received within the solenoid body 24 and the heated dispenser head 26 described above. The guide tube 44 is made of a material pervious to the magnetic field generated by the coil of the solenoid. The end of the guide tube which is received within the heated dispenser head is slightly larger than that end which is mounted within the solenoid body.

A pole piece 46 is press fit within the upstream end of the tubular guide tube 44. The exposed portion of the hole piece is threaded for attachment to the internally-threaded swivel nut 14 shown in FIG. 1. An axial throughbore 47 permits fluid flow from the heated supply hose 12 to the interior of the guide tube.

At the downstream end of the guide tube 44 is a seat member 52 which includes the nut 32. The seat member includes threaded regions, not shown, extending from both sides of the nut 32. One threaded region of the nozzle seat is received within the guide tube 44, while the other end attaches to an outlet member 48, shown in phantom, and the internally-threaded swivel nut 34.

An O-ring 50 is illustrated as being positioned between the swivel nut 34 and the nut 32 of the nozzle seat 52, but the O-ring may be at the upstream end of the nut 32 so as to abut the guide tube 44, as shown in FIG. 1. The purpose of the O-ring is to ensure a leak-proof coupling. The O-ring is preferably made of a relatively inelastic material. Elasticity in a hot-melt adhesive dispenser is undesirable since elasticity promotes adhesive drool from nozzles between adhesive applications. As adhesive pumping pressure is applied and then relaxed at the nozzles by activating and deactivating the solenoid, any elasticity in a coupling is greatly exaggerated. The tensioning and relaxing of pressure experienced during assembly line sealing causes an oscillation which results in drool from the nozzles between adhesive applications.

Referring now to FIGS. 2 and 3, an armature 54 is reciprocatingly mounted within the tubular guide tube 44. A needle 56 is mounted at the downstream end of the armature 54. The needle 56 is shown in FIG. 2 as moving rearwardly from a closed position to an open position. In the closed position the needle abuts the outlet member 48 to block the flow of adhesive through an outlet port 58. Upon actuation of the solenoid coil, the ferromagnetic pole piece 46 is magnetized to provide an attractive force on the armature 54. The attractive magnetic force draws the armature into an abutting relation with the downstream end 60 of the pole piece. Abutment of the armature against the pole piece removes the needle 56 from the outlet port 58 to permit fluid communication between the pole piece throughbore 47 and the outlet port 58. De-energization of the solenoid coil releases the armature 54. A helical spring 62 within the armature biases the needle 56 into a closed, blocking position of the outlet port. The force of the helical spring closes fluid flow until the solenoid coil is again energized to provide a force which overcomes the bias of the spring.

As best seen in FIG. 3, the upstream portion 64 of the armature 54 is flared relative to the downstream portion 66 The flared upstream portion has an outside diameter only slightly less than the inside diameter of the guide tube so that the outside surface acts as a bearing surface. An axial passageway of the armature comprises an expanded region 68, a reduced region 70, a threaded region 72 and a needle alignment region 74. Adhesive passage through the guide tube 44 is primarily through the axial passageway of the armature. Flow from the pole piece throughbore 47 enters the expanded region 68 of the armature and progresses through the reduced region 70. The needle 56 is attached to the threaded region 72 of the armature and, therefore, adhesive flow does not enter the downstream portion 66 of the armature. Instead, the adhesive exits through a transverse bore 76. From the transverse bore, the adhesive is directed toward the outlet port 58, shown in FIG. 2.

As noted above, in the open position the armature 54 abuts the pole piece 46. Upon de-energization of the solenoid coil, the force of the helical spring 62 overcomes residual magnetic force and has a tendency to drive the armature forwardly to seat the needle 56 against the outlet port 58. However, forward motion of the armature 54 requires a migration of hot-melt adhesive between the abutting surfaces of the armature and the pole piece. The adhesive is an extremely viscous material and the pressure involved with dispensing hot-melt adhesive does not promote the free flow of the material. Rather, migration is a slow process in terms of the response time of a solenoid. The end geometry of the armature 54 of the present invention is such as to improve the dynamic response time of the electromagnetic valving assembly of a hot-melt adhesive dispenser. As shown in FIG. 4, the end geometry of the armature 54 includes the axial bore 68, a recessed region 78 and a pair of facing C-shaped raised lips 80 and 82. The C-shaped lips are raised edges of the upstream end of the armature. As the armature is brought into abutting relation with the pole piece 46, it is only the raised edge lips 80 and 82 which contact the downstream surface of the pole piece. It has been discovered that restricting abutment of the armature 54 against the pole piece 46 to the edges of the abutting ends improves the closing dynamic response time of the armature without significantly affecting the dynamic opening response time. Migration of the viscous hot-melt adhesive upon de-energization of the solenoid coil need occur only between a limited surface area of the C-shaped raised lips 80 and 82. A dynamic closing response time of 0.012 seconds has been achieved.

Raised edges, as compared to raised interior regions, provide a number of advantages. Firstly, the raised edge aids in maintaining the armature in a position perpendicular to the downstream end of the pole piece. At the outside edge, the area of contact with the pole piece is maximized, given a width of the raised region. Moreover, the raised edge acts as a bearing surface as the armature 54 is moved rearwardly toward the pole piece. A second advantage is that because the area of the armature 54 which abuts the pole piece 46 is larger than a given-width raised region at the interior of an armature, the force upon collision of the two members is distributed over a relatively wide area and, therefore, is less susceptible to premature wear.

While the focus of the design of the end geometry of FIG. 4 is primarily upon the closing dynamic response time by addressing the migration problem, the opening dynamic response time for applying hot-melt adhesive from a dispenser is equally important. A recessed region in the end of an armature affects the strength of the magnetic pull between a pole piece and an armature. Maximizing the height at the edge of the upstream end of the armature 54 minimizes the adverse affect of the recessed region 78. Both the pole piece 46 and the armature 54 include axial bores 47 and 68, respectively. Another advantage of the present invention is that the raised regions are at an area in which the lines of magnetic flux are concentrated so that any adverse effect on the dynamic opening response time is minimized.

The height of the C-shaped raised lips 80 and 82 play an important role in the proper end geometry of the armature 54. The lips are raised relative to the recessed region 78 by 0.001 to 0.01 inch, and are preferably 0.005 to 0.006 inch. A height which is too great will affect the performance of the solenoid by significantly affecting the magnetic attractive force between the armature 54 and the pole piece 46. A height which is not sufficiently large will cause the armature to still experience the migration problem of hot-melt adhesive. The migration problem will only worsen over time since char tends to build up between an armature and a pole piece. Char is a chemical degradation of hot-melt adhesive and if it builds up the char will fill the gap created by insufficiently large lips.

The width of each C-shaped edge lip is in the range of 0.02 inch to 0.044 inch. Below this range, the armature may be a high-maintenance part, since the collision of the raised edge with the pole piece may cause the end of the armature to wear prematurely. However, the incentive is to minimize the width of the raised edges, since an increase in the width increases the effects of the slow migration of hot-melt adhesive.

As seen in FIG. 4, the generally cylindrical armature 54 has lateral surfaces 84 and 86 which are cut away to permit fluid flow of hot-melt adhesive along the periphery of the armature 54. Fluid flow is primarily through the axial passageway 68 of the armature, but the cutaway portions permit secondary pass. Moreover, during rearward motion of the armature, the viscous adhesive material is allowed to migrate along the sides of the armature rather than being restricted to the axial passageway. In this manner, the cutaway portions of the generally cylindrical armature aid in minimizing the dynamic opening response time.

FIG. 5 is an alternative embodiment of the end geometry of the armature 54. Again, the end geometry includes an axial bore 86 and opposed raised C-shaped edge lips 88 and 90. Between the axial bore and the edge lips is a recessed region 92. The edge lips preferably extend above the recessed region by a distance of 0.005 to 0.006 inch. The raised edge lips are spaced apart by grooves 94 and 96 along the peripheral surface of the generally cylindrical armature 98. The operating principles described above with reference to FIG. 4 apply equally to the embodiment of the armature of FIG. 5. Optionally, the raised edge lips 80 and 82 of FIG. 4 or the raised edge lips 88 and 90 of FIG. 5 may have center slits so that the C-shaped raised regions are four in number, rather than two.

In operation, upon energization of a solenoid coil, the pole piece 46 of FIG. 2 is magnetized and an attractive force is generated to draw the armature 54 into contact with the pole piece. The attractive force overcomes the bias of the helical spring 62 and fluid flow of the viscous material is primarily from the throughbore 47 of the pole piece 46, along the axis of the armature for exit from the transverse bore 76, and out the outlet port 58. A secondary flow takes place along the cutaway periphery of the armature.

De-energization of the solenoid coil releases the armature 54. The helical spring 62 urges the armature forwardly into a closed position in which the needle 56 blocks fluid flow to the outlet port 58. Movement of the armature from the pole piece 46, however, requires migration of the viscous hot-melt adhesive between the abutting surfaces of the two members. The raised C-shaped edge lips 80 and 82 shown in FIG. 4 limit the required migration of adhesive to those edge portions.

While the present invention has been illustrated as having an armature with an end geometry which includes the axial bore, the recessed region and the opposed C-shaped edges, the end geometry may be that of the pole piece rather than the armature. That is, the upstream end of the armature may be planar and the pole piece may have &:he recessed region and the raised C-shaped lips. It may further be possible to include a stop member between the pole piece and the armature, with the stop member having an end geometry such as that of FIG. 4 or FIG. 5 at one end. The stop member, however, should be made of a ferromagnetic material so that it does not adversely affect the magnetic attractive force upon activation of this solenoid.

I claim:

1. An electromagnetic valving assembly for viscous material comprising,
    solenoid means for selectively generating a magnetic field, said solenoid means including a solenoid body having a flow passageway disposed for channeling a stream of viscous material through said magnetic field, said solenoid means having an armature-seating face within said flow passageway, said armature-seating face having an aperture for passage of said viscous material therethrough,
    outlet means in fluid communication with said flow passageway for directing said stream of viscous material therefrom, said outlet means having an outlet port, and
    an armature mounted within said flow passageway for reciprocating motion to open and close said outlet port, said armature biased in a closed position, said magnetic field of said solenoid means providing a force to displace said armature into an open position in which an upstream end of said armature contacts said armature-seating face,
    one of said armature-seating face of said solenoid means and said upstream end of said armature recessed at an inner region and raised along an outside edge, contact between said armature-seating face and said upstream end being limited to said raised outside edge, wherein said raised outside edge includes a pair of C-shaped edge lips.

2. The valving assembly of claim 1 wherein the concave surfaces defined by said C-shaped edge lips are adjacent to said recessed inner region.

3. The valving assembly of claim 1 wherein said C-shaped edge lips are raised relative to said recessed inner region by a distance in the range of 0.001 inch to 0.01 inch.

4. The valving assembly of claim 1 wherein said armature-seating face is a downstream end of a pole piece made of a ferromagnetic material, said pole piece having an axial flow path aligned with a center bore in said armature.

5. An electromagnetic valving assembly for viscous material comprising,
    solenoid means for selectively generating a magnetic field, said solenoid means including a solenoid body having a flow passageway disposed for channeling a stream of viscous material through said magnetic field, said solenoid means having an armature-seating face within said flow passageway, said armature-seating face having an aperture for passage of said viscous material therethrough,
    outlet means in fluid communication with said flow passageway for directing said stream of viscous material therefrom, said outlet means having an outlet port, and
    an armature mounted within said flow passageway for reciprocating motion to open and close said outlet port, said armature biased in a closed position, said magnetic field of said solenoid means providing a force to displace said armature into an open position in which an upstream end of said armature contacts said armature-seating face,
    one of said armature-seating face of said solenoid means and said upstream end of said armature recessed at an inner region and raised along an outside edge, contact between said armature-seating face and said upstream end being limited to said raised outside edge, wherein said raised outside edge is a plurality of raised lips extending from said armature, said armature having a generally cylindrical upstream portion and having a central bore for the passage of viscous fluid material, said recessed inner region surrounding said central bore.

6. The valving assembly of claim 5 wherein the generally cylindrical surface of said armature has a plurality of cutaway segments.

7. The valving assembly of claim 1 wherein each C-shaped edge lip has a width in the range of 0.02 to 0.044 inch.

8. An electromagnetic valving assembly for viscous material comprising,
    a housing having a flow passageway for viscous material and having an inlet end and an outlet port,
    a ferromagnetic pole piece at said inlet end of said housing, said pole piece having an aperture-seating face and an inlet port in fluid communication with said outlet port,
    a coil disposed such that passage of current through said coil causes magnetization of said pole piece,
    an armature mounted within said flow passageway for reciprocating motion between a blocking position of said outlet port and an open position in which an upstream end of said armature abuts said armature-seating face of said pole piece, one of said armature-seating face and said upstream end having a central bore for passage of viscous fluid and having a recessed region surrounding said central bore and having a plurality of raised lips at the edge of said one, and spring means between said pole piece and said armature for-biasing said armature into said blocking position, said magnetization of said pole piece causing an attractive force to draw said armature into said open position.

9. The valving assembly of claim 8 wherein said raised edge lips extend from said recessed region by a distance in the range of 0.001 to 0.01 inch.

10. The valving assembly of claim 8 wherein said raised lips are on an upstream end of said armature and wherein said spring means is a helical spring, said armature having a generally cylindrical shape at an upstream portion and having an axial bore for fluid communication between said inlet port and said outlet port, said helical spring having a portion received in said axial bore of said armature.

11. The valving assembly of claim 10 wherein said inlet port of the pole piece is coaxial with said axial bore of the armature.

12. The valving assembly of claim 8 wherein the upstream portion of said armature is generally cylindrical and includes an axial bore and opposed grooves along the cylindrical surface of said upstream portion.

13. An electromagnetic valving assembly for dispensing adhesive comprising, a ferromagnetic pole piece having a throughbore in fluid communication with a source of pressurized adhesive, a housing, coupled to said pole piece, having a generally cylindrical flow passageway downstream of said throughbore, said housing having an outlet port, a coil located about said pole piece, selective conduction of current through said coil causing magnetization of said pole piece, an armature mounted within said generally cylindrical flow passageway for axial movement therein, said armature having an open position in which an upstream end of said armature contacts said pole piece, said armature having an axial bore to permit fluid communication between said pole piece throughbore and said outlet port when said armature is in said open position, said upstream end of said armature having a recessed region about said axial bore and having a plurality of raised lips at the edge thereof, and spring means between said armature and said pole piece for biasing said armature in a closed position in which said armature blocks said outlet port, said magnetization of said pole piece providing an attractive force to draw said armature toward said open position.

14. The valving assembly of claim 12 wherein said raised lips of said upstream end of the armature are two in number and have a C-shaped configuration.

15. The valving assembly of claim 12 wherein said raised lips extend from said recessed region by a distance in the range of 0.001 to 0.01 inch.

16. The valving assembly of claim 13 wherein said spring means is a helical spring and is received in said axial bore of said armature.

17. The valving assembly of claim 13 wherein said armature is generally cylindrical at an upstream portion and has a plurality of grooves extending along the generally cylindrical surface of said upstream portion.

* * * * *

UNITED STATES PATENT AND TRADEMARK OFFICE
CERTIFICATE OF CORRECTION

PATENT NO. : 4,951,917

DATED : August 28, 1990

INVENTOR(S) : W. Harrison Faulkner III

It is certified that error appears in the above-identified patent and that said Letters Patent is hereby corrected as shown below:

Column 7, line 34, "may have &:he" should read
- - may have the - -.

Claim 8, column 9, line 6, "for-biasing" should read
- - for biasing - -.

Claim 14, column 10, line 23, "of claim 12" should read
- - of claim 13 - -

Claim 15, column 10, line 26, "of claim 12" should read
- - of claim 13 - -.

Signed and Sealed this

Twenty-fifth Day of February, 1992

Attest:

HARRY F. MANBECK, JR.

*Attesting Officer*     *Commissioner of Patents and Trademarks*